July 6, 1943.   D. X. CLARIN   2,323,795
CONTAINER
Filed April 30, 1941
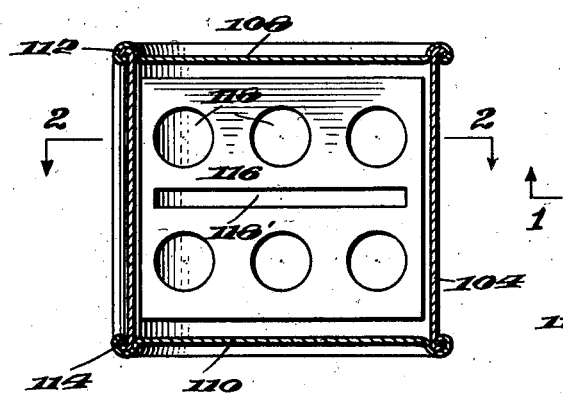
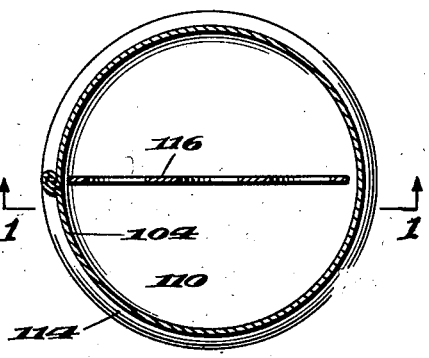
Inventor
David X. Clarin,
By James H. Littlepage
Attorney Patented July 6, 1943

2,323,795

UNITED STATES PATENT OFFICE 2,323,795

CONTAINER

David X. Clarin, New York, N. Y.

Application April 30, 1941, Serial No. 391,199

3 Claims. (Cl. 259—72)

This invention relates to containers, particularly cans, or the like, of metal, cardboard, plastics or other materials having agitating baffles therein.

In the packing, preparation and shipping of loose materials, powders, liquids or semi-liquids, and the like, it is often important that the contents of a can be agitated or otherwise stirred after the can has been filled and closed. This is particularly desirable in the preparation of products such as condensed or evaporated milk, because condensed or evaporated milk undergoes considerable heat treatment after the can has been sealed. When heated, the milk adjacent the walls of the can tends to overheat too quickly or undesirably and the milk adjacent the center of the can obtains insufficient heat, or reaches proper temperature too slowly. Various approaches have been made towards solving this difficulty, as by rolling or tumbling the cans through the heating medium as they are heated. The present invention is intended to supplement the above method by providing a baffle, preferably perforated or slotted, so that, as the cans are rolled, the baffle will provide extra agitation, thus shortening the time required in the heating medium to bring the contents to the desired temperature, and thus improving the flavor of the milk.

This is also desirable when the contents of the can comprise paint or similar materials, where there is a tendency to settle to the bottom of the container. The present invention would make it possible to remix the paint or other contents, before opening the container, by rolling, shaking or other agitation of the container, thus stirring or agitating the contents to their original consistency.

In the illustrated form of the invention, it is intended to provide a baffle plate that can be loosely placed inside the can so that, as the can is rolled, the rotational movement of the baffle plate will vary substantially from that of the can so as to increase the agitation of the contents of the can.

A further objective is to provide perforations or slots of varying shapes in the several baffle structures so as to allow the material in the can to flow therethrough, thus creating more rapid and better mixing of the contents of the can. In this manner materials near the walls of the can will be forced to the center of the can and vice versa.

Among the other objects, it is intended to provide a baffle structure, the installation of which does not require substantial alteration of the form of cans now in use or in the methods and machinery for making them. Accordingly, it is proposed that the structures described herein be easy, simple and inexpensive to make and install and that the method of heating or pasturizing canned materials be greatly improved, thus helping to improve the flavor when the contents comprise evaporated or condensed milk. These and other objectives will appear from the following specification and the drawing, in which:

Fig. 1 is a vertical section on the line 1—1 of Fig. 2, showing a second form of the invention.

Fig. 2 is a horizontal section on the line 2—2 of Fig. 1.

Figs. 1 and 2 show the preferred form of the invention wherein an ordinary can formed of a cylindrical side wall 104 having top and bottom end walls 108 and 110, respectively, crimped thereto as shown at 112 and 114, is provided with a free baffle 116, preferably perforated or slotted as shown at 118, 118'. In this form of the invention the side and bottom walls of the can are formed and joined together in the ordinary manner. Either before or after the can is filled, baffle 116 is placed or automatically dropped inside the open can. Finally, when the baffle and the contents of the can are in place, top 108 is crimped into place and the can is then rolled or tumbled through the heating medium.

The length and width of baffle 116, it should be noted, are slightly less than the inside height and diameter, respectively, of the can so that the baffle is relatively free to move with respect to the contents of the can. Thus, as the can is rolled, movement of the canned material with respect to the can causes baffle 116 gently to mix the contents of the can. Since the space between any edge of the baffle and the inside of the can is not great, violent flopping of the baffle is avoided and, accordingly, chipping or deleterious scraping of the metal plating, or lacquer or other coating or surface inside the can, does not occur.

The structure described above has utility not only for agitating materials heated in the can, but also for mixing powdered or highly comminuted dry materials, or liquids and the like substances, wherein settling, stratifying or caking must be avoided. Furthermore, agitation occurs not only upon shaking or rolling the cans intentionally, but also as the result of ordinary shipping and handling operations.

The invention having been described and illustrated, it is not intended that the scope of the invention be limited to the specific disclosure, but only by the following claims.

I claim:

1. In a can or the like container having a substantially flat top and bottom and cylindrical sides, a loose, substantially flat rectangular baffle formed of perforated sheet material, the height of said baffle being substantially the distance between the top and bottom of the inside of the can and the width extending substantially diametrically of the inside of the can whereby, when said can is filled with fluent material, sealed, and rotated, said baffle will rotate relative to said can.

2. In a can or the like container having a substantially flat top and bottom and cylindrical sides, a loose baffle formed of perforated sheet material, the overall height of the baffle being substantially the distance between the top and bottom of the inside of the can and the width of said baffle extending substantially diametrically of the inside of the can, whereby, when said can is filled with fluent material, sealed, and rotated, said baffle will rotate relative to said can.

3. In a can or the like container adapted to be sealed having a cylindrical side wall, a loose baffle formed of perforated sheet material having substantially parallel side edges, the width of said baffle between said side edges extending substantially diametrically of the inside of the can whereby, when said can is filled with fluent material, sealed, and rotated, said baffle will rotate relative to said can.

DAVID X. CLARIN.